United States Patent [19] [11] 3,901,849
Dodson et al. [45] Aug. 26, 1975

[54] STABILIZED POLYOLEFIN COMPOSITIONS
[75] Inventors: Daniel P. Dodson; James E. Baird, both of Longview, Tex.
[73] Assignee: Eastman Kodak Company, Rochester, N.Y.
[22] Filed: May 9, 1974
[21] Appl. No.: 468,308

[52] U.S. Cl. ........ 260/45.8 NW; 117/232; 252/404; 260/45.85 B
[51] Int. Cl. ............................................. C08f 45/60
[58] Field of Search ............ 260/45.85 B, 45.8 NW; 117/232; 252/404

[56] References Cited
UNITED STATES PATENTS

| | | | |
|---|---|---|---|
| 3,039,989 | 6/1962 | Eastman | 260/45.8 |
| 3,296,189 | 1/1967 | Eastman | 260/45.8 |
| 3,440,210 | 4/1969 | Blount et al. | 260/45.9 |
| 3,573,251 | 3/1971 | Megna et al. | 260/45.85 |
| 3,627,727 | 12/1971 | Tholstrup | 260/45.8 |
| 3,806,358 | 4/1974 | Glander et al. | 260/45.9 |

OTHER PUBLICATIONS
Crystalline Olefin Polymers, Part II, Vol. XX, by Raff et al., p. 382, (1965).
Bulletin No. M720 of Geigy Industrial Chemical, July 14, 1965, Irganox 1010.

Primary Examiner—V. P. Hoke

[57] ABSTRACT
Polyolefin compositions having improved resistance to oxidative degradation are provided by incorporating into the polyolefin composition a stabilizing amount of the combination of tetrakis[methylene(3,5-di-t-butyl-4-hydroxyhydrocinnamate)]methane and polymerized 1,2-dihydroxy-2,2,4-trimethylquinoline.

12 Claims, No Drawings

STABILIZED POLYOLEFIN COMPOSITIONS

The present invention relates to stabilized polyolefin compositions. More particularly, the present invention relates to the stabilization of polyolefins such as homopolymers and copolymers of ethylene and higher alpha-olefins against oxidative degradation.

Polyolefin compositions are well known in the art. The polyolefin compositions which are crystalline have found wide acceptance as moldable plastics. These moldable plastics such as, for example, polyethylene, low medium and high density, polypropylene and ethylene/propylene crystalline copolymer containing ten percent or less ethylene have been used to prepare many types of molded objects. However, these molded objects are unstable when exposed to oxygen, particularly when exposed to oxygen in the presence of heat. This unstability to oxygen causes degradation of the molded plastic with a loss of physical properties of the molded object.

It is known in the art that various compounds, such as phenolic and amine compounds, can be added to the moldable plastic to improve the oxidative stability of the plastic. It is also known that various combinations of these compounds with each other, or with other compounds, can improve the oxidative stability of some polymeric compositions. These prior art stabilizers and combinations of such stabilizers, however, have not been satisfactory for all applications for which polyolefins can be used. For example, some of these stabilizers can be removed from the polymeric compositions containing them by various methods. Such methods include volatilization or extraction during use of the plastic composition. Polyolefin compositions have found wide use as cable and wire coating compositions. Cable coating compositions used on cable which contains a filler, such as petrolatum, have not been completely satisfactory, as the petrolatum tends to extract the stabilizing compounds from the polyolefin coating, thereby decreasing the oxidative stability of the coating. It would, therefore, be an advance in the state of the art to provide a stabilizer system for polyolefins which can be used as cable coating compositions which resist extraction of the stabilizer from the polyolefin coating when exposed to cable fillers, such as petrolatum.

Accordingly, it is one object of the invention to provide stabilized polyolefin compositions.

Another object of this invention is to provide stabilized polyolefin compositions with improved stabilizer retention.

Another object of this invention is a stabilizer combination useful in polyolefins.

A still further object of the invention is a stabilizer combination which resists extraction with petrolatum from polyolefin substrates.

Further objects and advantages of the invention will be apparent to those skilled in the art from this disclosure and claims.

In accordance with this invention, it has been discovered that the combination of tetrakis[methylene(3,5-di-t-butyl-4-hydroxyhydrocinnamate)]methane of the formula:

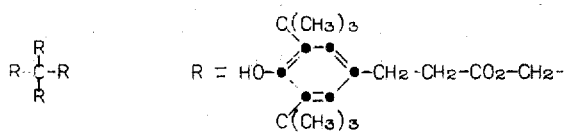

and polymerized 1,2-dihydroxy-2,2,4-trimethylquinoline (having a melting point of greater than 75°C., preferably greater than 100°C.) of the formula:

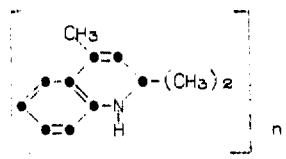

possesses a significant ability to protect polyolefins against deterioration due to oxygen and heat and that the protection is retained even after severe aging, such as in petrolatum (a petroleum distillate having a softening point of 60°–65°F. and containing 10–15 percent mineral oil). The result obtained with this particular stabilizer combination was unobvious and unexpected since each of these stabilizing compounds, which have been previously used as antioxidants, when used along is not an effective petrolatum extraction resistance oxidation stabilizer for polyolefins.

The amount of tetrakis[methylene(3,5-di-t-butyl-4-hydroxyhydrocinnamate)]methane, and the polymerized 1,2-dihydroxy-2,2,4-trimethylquinoline, incorporated into the polyolefin can be varied independently from a very small stabilizing amount up to several percent. More specifically, beneficial results are normally obtained when the ratio of the phenolic compound to the polymerized 1,2-dihydroxy-2,2,4-trimethylquinoline is in the range of about 1 to 1.2 to 1 to 2.5, preferably 1 to 1.5 to 1 to 2.3, and the total stabilizer combination is from about 0.6 percent to about 5 percent by weight of the polyolefin with the preferable concentration being about 0.6 percent to about 3 percent of the polyolefin. If the stabilizer is used in an amount of less than 0.6 percent, the polyolefin composition does not possess the longer term stability necessary for all commercial applications. If the stabilizer is used in an amount greater than 5 percent by weight, very little stability is obtained for the increased stabilizer.

The stability system of this invention is useful in any application in which it is desirable to protect the polyolefin such as polypropylene from the deterioration due to oxygen and heat. However, it is expected to find its major use in applications where extraction of the stabilizers is a problem such as a stabilizer for polyolefin insulation in electrical cables filled with petrolatum.

As previously pointed out hereinbefore, it is known that phenolic antioxidants, including tetrakis[methylene(3,5-di-t-butyl-4-hydroxyhydrocinnamate)]methane, stabilize homopolymers and copolymers of ethylene and propylene against the adverse effects of heat and oxidation. It is also known that amine antioxidants, including polymerized 1,2-dihydroxy-2,2,4-trimethylquinoline, stabilize homopolymers and copolymers of ethylene and propylene against the adverse effects of heat and oxidation. However, prior combinations of the phenolic stabilizers with other types of stabilizers, such as sulfur containing compounds and organophosphorous compounds, have proved to have limitations due to the case with which they are extracted by petrolatum and other petroleum distillates. This decrease in resistance to oxidative and heat degradation of a stabilized polyolefin in the presence of an extracting solvent is related to the physical separation of the stabilizer from the polymer. The means by which separation occurs is thought to be through diffusion of the stabilizer and subsequent extraction.

This decrease in resistance to oxidative degradation was observed when a polyolefin stabilized with tetrakis-[methylene(3,5-di-5-butyl-4-hydroxyhydrocinnamate)]methane was exposed to petrolatum. Likewise, a polyolefin stabilized with polymerized 1,2-dihydroxy-2,2,4-trimethylquinoline was observed to undergo the same phenomenon. Since both of these stabilizers, when used alone, were observed to be extracted by the petrolatum, it was quite surprising and unexpected that the combination of the two stabilizers resisted extraction.

This invention will be further illustrated by the following examples although it will be understood that these examples are included merely for purposes of illustration and are not intended to limit the scope of the invention.

EXAMPLE 1

A composition was prepared by blending in a Banbury mixer for 5 minutes 80 parts of a propylene-ethylene copolymer containing 1.3 percent ethylene and having a Fisher-Johns melting point of about 156°C.; 20 parts polyethylene having a melting point of 112°C., melt index of 0.2, and density of 0.923 gram per cubic centimeter; 0.1 part oxalic acid bi(benzylidene hydrazide) as a metal deactivator; 0.3 part tetrakis[methylene(3,5-di-t-butyl-4-hydroxyhydrocinnamate)]methane; and 0.5 part polymerized 1,2-dihydroxy-2,2,4-trimethylquinoline having a melting point of 105°C. The composition was compression molded into 10 mil buttons of 1½ inch diameter at a pressure of 10,000 psi using a cycle of 200°C. for 1 minute and then cooled under tap water. The buttons were aged for 8 hours at 85°C. in petrolatum containing 0.5 percent by weight of tetrakis[methylene(3,5-di-t-butyl-4-hydroxyhydrocinnamate)]methane. Petrolatum aging was followed by 18 hours oven aging in a forced air oven at 85°C.

Stability of the samples was determined using differential scanning calorimetry. In this procedure a 3–5 milligram portion of the aged button is heated in an oxygen atmosphere at 200°C. in a preoxidized copper sample holder until catastrophic failure occurs, which failure is recorded as a strong exothermic peak.

The time required until failure of the specimen is referred to as oxidative induction time and is a measure of the stability of the sample.

For the sake of comparison, compositions were also prepared and evaluated as above with the exception that either no tetrakis-[methylene(3,5-di-t-butyl-4-hydroxyhydrocinnamate)]methane was used (Control A) or no polymerized 1,2-dihydroxy-2,2,4-trimethylquinoline was used (Control B). When one of the antioxidants was deleted, the other was increased so that the total antioxidant concentration was 0.8 percent. Results of the differential scanning calorimetry stability test are tabulated below.

| Sample | Oxidative Induction Time (min.) |
|---|---|
| Example 1 | 82 |
| Control A | 45 |
| Control B | 16 |

EXAMPLE 2

Compositions were made using the same base polyolefins as in Example 1, but with the percent of polymerized 1,2-dihydroxy-2,2,4-trimethylquinoline (minimum melting point of 105°C.) varied from 0.3 to 0.5 while the percent of tetrakis[methylene(3,5-di-t-butyl-4-hydroxyhydrocinnamate)]methane was held constant at 0.3. The composition also contained 0.1 percent oxalic acid bis(benzylidene hydrazide) as a metal deactivator. The compositions made and the resulting oxidative induction times for the samples, after extraction and aging as in Example 1, are as follows:

| Sample | % Polymerized 1,2-Dihydroxy-2,2,4-trimethylquinoline | Oxidative induction Time (min.) | Ratio of Phenol to Trimethyl-quinoline |
|---|---|---|---|
| A | 0.3 | 18 | 1/1 |
| B | 0.35 | 37 | 1/1.17 |
| C | 0.4 | 57 | 1/1.33 |
| D | 0.45 | 51 | 1/1.5 |
| E | 0.5 | 86 | 1/1.67 |

EXAMPLE 3

Compositions were made using the same base materials as in Example 1, but the percent of tetrakis[methylene(3,5-di-t-butyl-4-hydroxyhydrocinnamate)]methane was varied from 0.1 to 0.3 while the percent of polymerized 1,2-dihydroxy-2,2,4-trimethylquinoline was held constant at 0.5. The metal deactivator oxalic acid bis(benzylidene hydrazide) was contained in the composition at the 0.1 percent level.

The compositions made and the oxidative induction time for the samples, after extraction and aging as in Example 1, are as follows:

| Sample | % Tetrakis[methylene-(3,5-di-t-butyl-4-hydroxyhydro-cinnamate)]methane | Oxidative Induction Time (min.) | Ratio of Phenol to Trimethyl-quinoline |
|---|---|---|---|
| A | 0.1 | 32 | 1/5 |
| B | 0.2 | 40 | 1/2.5 |
| C | 0.225 | >60 | 1/2.22 |
| D | 0.275 | >60 | 1/1.82 |
| E | 0.3 | 86 | 1/1.67 |

EXAMPLE 4

A composition was prepared on the Banbury mixer as in Example 1 containing 0.3 percent tetrakis[methylene(3,5-di-t-butyl-4-hydroxyhydrocinnamate)]methane, 0.5 percent polymerized 1,2-dihydroxy-2,2,4-trimethylquinoline, and 0.1 percent oxalic acid bis(benzylidene hydrazide) in a propylene homopolymer base having a melting point of 164°C. and a flow rate of 3.5.

The oxidative induction time for the sample, after extraction and aging as in Example 1, was greater than 88 minutes.

EXAMPLE 5

Compositions were prepared as in Example 1 using the same base materials, but the 0.3 percent tetrakis[methylene(3,5-t-butyl-4-hydroxyhydrocinnamate)]methane hydroxyhydrocinnamate)]methane was replaced with other phenolic antioxidants. The phenolic antioxidants used were follows: Sample A - (tris(3,5-di-t-butyl-4-hydroxybenzyl) isocyanurate (Goodrite 3114); Sample B - 3,5-di-t-butyl-4-hydroxyhydrocinnamic acid triester with 1,3,5-tris(2-hydroxyethyl)-s-triazine-2,4,6-(1H, 3H, 5H)-trione (Goodrite 3125); Sample C - 1,3,5-tris(3,5-di-t-butyl-4-hydroxybenzyl)-2,4,6-trimethylbenzene; Sample D - a hindered phenol supplied by Uniroyal Chemical Company and sold under the trade name Naugard 442.

The oxidative induction time for each of the samples, after extraction and aging as in Example 1, is:

|           | Oxidative Induction Time (min.) |
|-----------|---------------------------------|
| Sample A  | 29                              |
| Sample B  | 38                              |
| Sample C  | 50                              |
| Sample D  | 37                              |

The stabilized polyolefin compositions of the present invention provide moldable compositions which can be molded into objects which are unexpectedly stable to oxidative degradation. Such objects include, for example, plates, bowls, toys, garbage cans, and coatings for various uses such as wire coatings. Other additives, stabilizers, copper deactivators, pigments, dyes and the like can also be added to the stabilized compositions.

Although the invention has been described in considerable detail with particular reference to certain preferred embodiments thereof, variations and modifications can be effected within the spirit and scope of the invention.

We claim:

1. Polyolefin compositions having improved resistance to degradation which contain about 0.6 to about 5 weight percent of a stabilizing combination comprising tetrakis[methylene(3,5-di-t-butyl-4-hydroxyhydrocinnamate)]methane and polymerized 1,2-dihydroxy-2,2,4-trimethylquinoline wherein the ratio of tetrakis [methylene (3,5-di-t-butyl-4 hydroxyhydrocinnamate)] -methane to polymerized 1,2-dihydroxy-2,2,4-trimethylquinoline is from 1.0:1.2 to 1.0: 2.5.

2. Polyolefin compositions according to claim 1 wherein the ratio of tetrakis[methylene(3,5-di-t-butyl-4-hydroxyhydrocinnamate)]methane to polymerized 1,2-dihydroxy-2,2,4-trimethylquinoline is from 1.0:1.5 to 1.0:1.23.

3. Polyolefin compositions according to claim 2 wherein said stabilizing combination is present in the polyolefin composition in an amount of from about 0.6 to about 5 weight percent.

4. Polyolefin compositions according to claim 3 wherein said polyolefin is polyethylene.

5. Polyolefin compositions according to claim 3 wherein said polyolefin is polypropylene.

6. Polyolefin compositions according to claim 3 wherein said polyolefin is ethylene/propylene block copolymer containing less than 10 percent by weight ethylene.

7. Polyolefin compositions according to claim 3 wherein said stabilizing combination is present in the polyolefin composition in an amount of from about 0.6 to about 3 weight percent.

8. Polyolefin compositions according to claim 7 wherein said polyolefin is polyethylene.

9. Polyolefin compositions according to claim 7 wherein said polyolefin is polypropylene.

10. Polyolefin compositions according to claim 7 wherein said polyolefin is ethylene/propylene block copolymer containing less than 10 percent by weight ethylene.

11. A stabilizing combination comprising tetrakis[methylene(3,5-di-t-butyl-4-hydroxyhydrocinnamate)]methane and polymerized 1,2-dihydroxy-2,2,4-trimethylquinoline wherein the ratio of tetrakis [methylene (3,5-di-t-butyl-4 hydroxyhydrocinnamate)] -methane to polymerized 1,2-dihydroxy-2,2,4-trimethylquinoline is from 1.0:1.2 to 1.0: 2.5.

12. A stabilizing combination according to claim 11 wherein the ratio of tetrakis[methylene(3,5-di-t-butyl-4-hydroxyhydrocinnamate]-methane to polymerized 1,2-dihydroxy-2,2,4-trimethylquinoline is from 1.0:1.5 to 1.0:1.23.

* * * * *